(12) United States Patent
Lin

(10) Patent No.: US 6,305,618 B1
(45) Date of Patent: Oct. 23, 2001

(54) ILLUMINATED WINDSHIELD WIPER NOZZLE

(76) Inventor: Yung-Fa Lin, 6F., No. 2, Lane 163, Hsin I Rd., Panchiao City, Taipei Hsien (TW)

(*) Notice: Subject to any disclaimer, the term of this patent is extended or adjusted under 35 U.S.C. 154(b) by 0 days.

(21) Appl. No.: 09/742,541

(22) Filed: Dec. 22, 2000

(51) Int. Cl.[7] .................................. B05B 1/10; B60S 1/46
(52) U.S. Cl. ................................ 239/284.1; 239/284.2; 239/17
(58) Field of Search ........................... 239/284.1, 284.2, 239/17

(56) References Cited

U.S. PATENT DOCUMENTS

| | | | |
|---|---|---|---|
| 4,749,126 | * 6/1988 | Kessener et al. | 239/18 X |
| 5,163,619 | * 11/1992 | Wada | 239/284.1 |
| 5,678,617 | * 10/1997 | Kuykendal et al. | 141/392 |
| 6,152,384 | * 11/2000 | Lopez et al. | 239/284.1 |

* cited by examiner

Primary Examiner—David A. Scherbel
Assistant Examiner—Robin O. Evans
(74) Attorney, Agent, or Firm—Jacobson Holman, PLLC

(57) ABSTRACT

An Illuminated Windshield Wiper Nozzle is designed with a nozzle installed at the outlet of a channel inside the base. The channel is connected with the auto's pump and water tank. Water is pumped into the channel and sprays out of the nozzle. The creation features a transparent base equipped with an illuminator at front end. The above construction enables the illuminator to give light at the same time when the pump is started to spray water, thus producing a wonderful effect.

6 Claims, 2 Drawing Sheets

ILLUMINATED WINDSHIELD WIPER NOZZLE

BACKGROUND OF THE INVENTION

1. Field of the Invention

An 'illuminated windshield wiper nozzle' specially refers to that equipped with an illuminator, which gives light at the same time when water is sprayed out of the windshield wiper nozzle, thus producing a wonderful effect.

2. Description of the Prior Art

In general, when a car is driven in a rainy day, the windshield wiper has to be used to wipe the raindrops or rain off the windshield so as not to obstruct the driver's view.

After rain stopping, however, the raindrops will leave water stains on the windshield after getting dry. They, together with the dust in the air, will make the windshield misty and affect the driver's sight.

Therefore, the wiper has to be used to clean off the water stains and dust on the windshield. But the wiper can not easily remove the dirt on windshield in dry condition and is likely to damage the windshield. Only wiping with water can effectively remove the water stains and dust on the windshield as well as avoid damaging the screen.

It is well known that the wiper nozzle set in front of the windshield is installed inside a base with pipes while operation of the wiper and the nozzle will obstruct the driver's view to a certain degree. As a result, the driver can not be reminded of the head-on auto and traffic accident is likely to happen.

Also, in case the tank is out of water, dry wiping is likely to damage the windshield.

In addition, the wiper nozzle, which is only used for spraying water without other purposes, is necessarily improved.

With view to the above defects in auto's windshield wiper nozzle, the creator started to conceive and finally designed an illuminated windshield wiper nozzle. It is designed with a nozzle installed at the outlet of a channel inside the base. The channel is connected with the auto's pump and water tank. Water is pumped into the channel and sprays out of the nozzle. The creation features a transparent base equipped with an illuminator at front end. The above construction enables the illuminator to give light at the same time when the pump is started to spray water, thus producing a wonderful effect and effectively reminding the driver to pay attention to the head-on auto to avoid accidents.

SUMMARY OF THE INVENTION

It is therefore a primary object of the present invention to provide a windshield wiper nozzle equipped with an illuminator. The illuminator will give light at the same time when water sprays out of the nozzle, thus producing a wonderful effect.

It is a further object of the present invention to provide a windshield wiper nozzle equipped with an illuminator. The illuminator will give light at the same time when water sprays out of the nozzle, thus effectively reminding the driver to pay attention to the head-on auto to avoid accidents.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
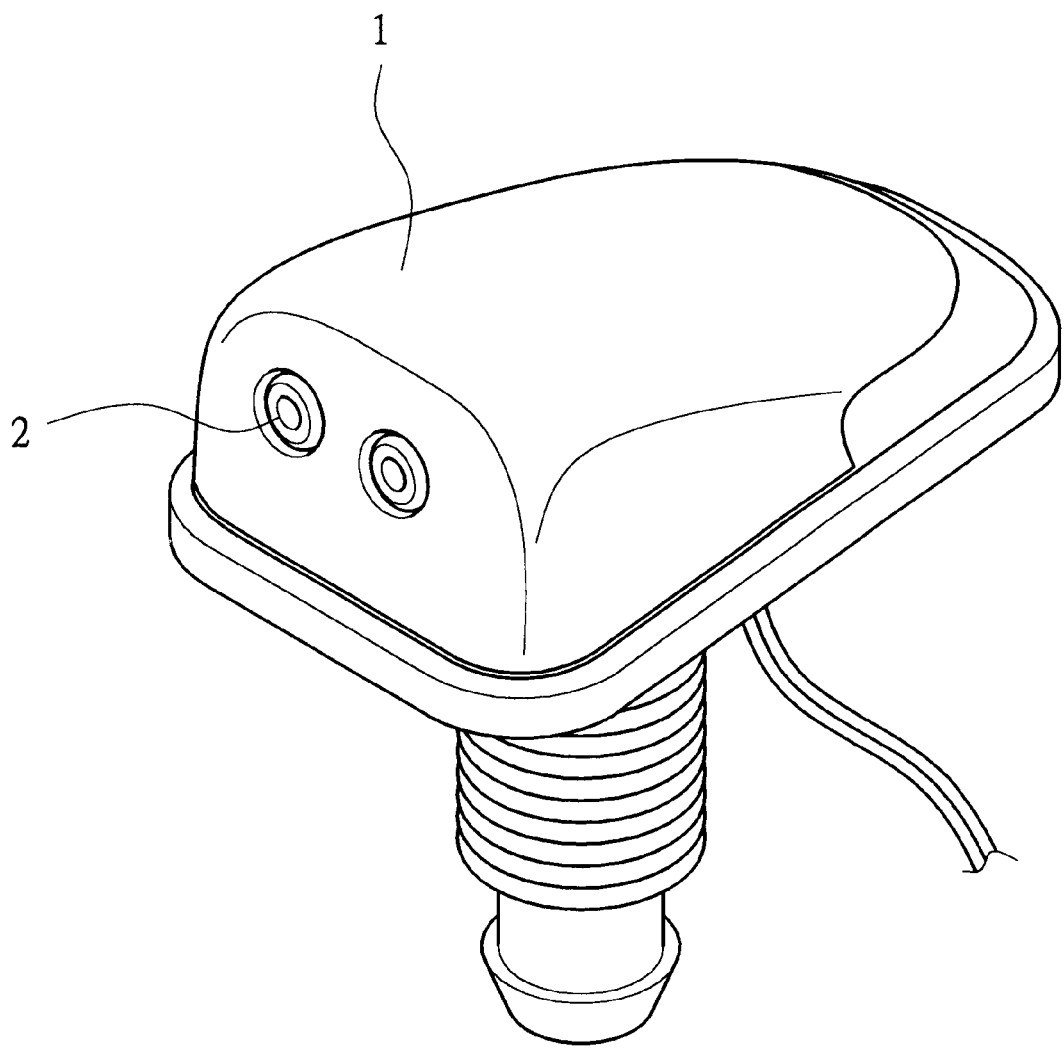
FIG. 1 is a perspective view of the present invention.
Figure 2:
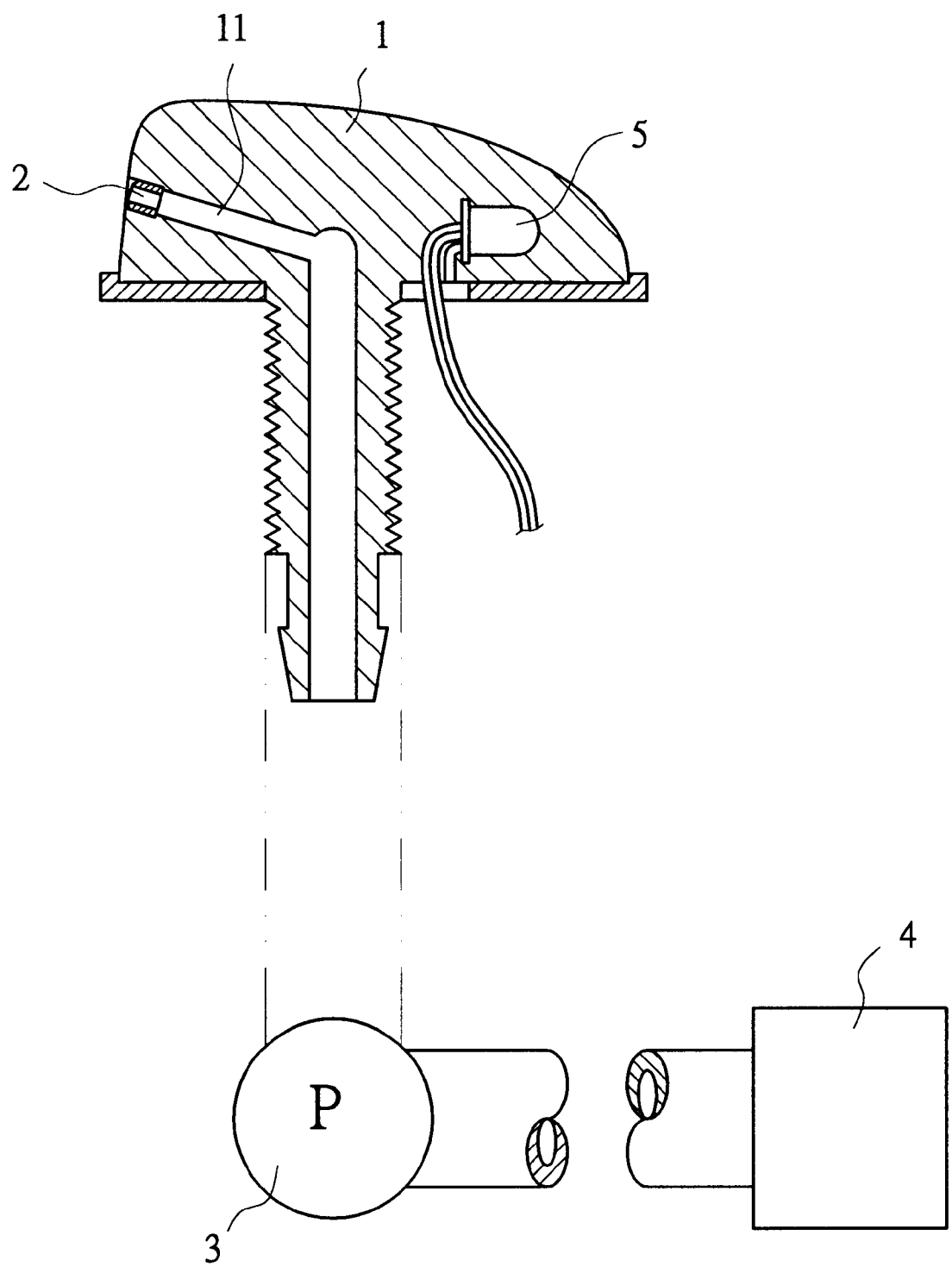
FIG. 2 is an assembling cross-sectional view of the present invention.

Please refer to FIG. 1 and FIG. 2 first. This creation is designed with a nozzle (2) installed at the outlet of a channel (11) inside the base (1). The channel (11) is connected with the auto's pump (3) and water tank (4). Water is pumped into the channel (11) and sprays out of the nozzle (2). The creation features a transparent base (1) and an illuminator (5) equipped at front end of the base (1).

Based on the above construction, at the moment when the auto's windshield wiper is started and water is pumped to spray out of the nozzle (2) of the base (1), the illuminator (5) will give light, thus producing a wonderful effect.

Furthermore, the illuminator (5) on the base (1) gives light at the same time when the driver is starting the wiper and spraying water for wiping, which can catch the attention of the head-on auto to avoid accidents.

In addition, when the tank is out of water, the illuminator will give light, thus effectively reminding the driver to add water into the tank to avoid damages on the windshield out of dry wiping.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claim.

What is claimed is:

1. A windshield wiper nozzle for spraying a windshield of an automobile having a water pump and a water tank, said tank storing spraying fluid and said water pump pumping said fluid on demand from said water tank, said windshield wiper nozzle comprising:

a transparent base having a front end and a back end;

at least one spray nozzle for spraying the windshield of the automobile and said at least one spray nozzle being positioned in said back end of said transparent base;

an outlet connected to said at least one spray nozzle for receiving fluid from the water tank pumped by the water pump;

a channel for connecting said outlet to the water pump to transport fluid from said water tank to said at least one spray nozzle on demand; and an illuminator positioned in said front end of said transparent base for illuminating said transparent base at the same time that said water pump is pumping fluid to said at least one spray nozzle.

2. The windshield wiper nozzle for spraying the windshield of an automobile as claimed in claim 1 wherein said fluid is windshield wiper fluid.

3. The windshield wiper nozzle for spraying the windshield of an automobile as claimed in claim 1, wherein said at least one nozzle includes a first nozzle and a second nozzle, and said first and second nozzles being equally positioned on said back end of said transparent base for simultaneously spraying the windshield of the automobile.

4. The windshield wiper nozzle for spraying the windshield of an automobile as claimed in claim 1 wherein said fluid is water.

5. The windshield wiper nozzle for spraying the windshield of an automobile as claimed in claim 3, wherein said illuminator illuminating said transparent base at the same time that said water pump is pumping fluid to said first and second spray nozzles.

6. The windshield wiper nozzle for spraying the windshield of an automobile as claimed in claim 1 wherein said illuminator illuminating said transparent base at the same time that said water pump is demanded to pump fluid even if the water tank is empty so that an illuminated indication is provided when the water tank needs fluid.

\* \* \* \* \*